United States Patent
Kim et al.

(10) Patent No.: US 10,484,885 B2
(45) Date of Patent: Nov. 19, 2019

(54) APPARATUS AND METHOD FOR BEAM-FORMING COMMUNICATION IN MOBILE WIRELESS BACKHAUL NETWORK

(71) Applicant: ELECTRONICS AND TELECOMMUNICATIONS RESEARCH INSTITUTE, Daejeon (KR)

(72) Inventors: Junhyeong Kim, Daejeon (KR); Bing Hui, Daejeon (KR); Il Gyu Kim, Chungcheongbuk-do (KR); Hoon Lee, Daejeon (KR); Hyun Kyu Chung, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 11 days.

(21) Appl. No.: 15/595,037

(22) Filed: May 15, 2017

(65) Prior Publication Data
US 2017/0339575 A1    Nov. 23, 2017

(30) Foreign Application Priority Data
May 17, 2016    (KR) .................. 10-2016-0059981

(51) Int. Cl.
*H04W 16/28* (2009.01)
*G01S 3/14* (2006.01)
(Continued)

(52) U.S. Cl.
CPC .............. *H04W 16/28* (2013.01); *G01S 3/14* (2013.01); *G01S 5/0054* (2013.01); *H04W 64/006* (2013.01)

(58) Field of Classification Search
CPC .. H04B 7/0617; H04B 7/0695; H04B 7/0691; H04B 7/0874; H04B 7/088; H04W 16/28;
(Continued)

(56) References Cited

U.S. PATENT DOCUMENTS

| 6,233,466 B1 * | 5/2001 | Wong ..................... H01Q 1/246 |
| | | 370/342 |
| 2002/0002066 A1* | 1/2002 | Pallonen ............... H04W 64/00 |
| | | 455/562.1 |

(Continued)

FOREIGN PATENT DOCUMENTS

| KR | 10-2009-0116079 A | 11/2009 |
| KR | 10-2014-0002403 A | 1/2014 |

(Continued)

OTHER PUBLICATIONS

"Comparison aspects of fixed and adaptive beamforming for LTE downlink", 3GPP TSG RAN WG1 #50bis, R1-073937, Oct. 2007.

*Primary Examiner* — Edward F Urban
*Assistant Examiner* — Rui M Hu
(74) *Attorney, Agent, or Firm* — LRK Patent Law Firm

(57) ABSTRACT

An apparatus and method for beam-forming communication in a mobile wireless backhaul network. The apparatus included in a base station includes: an antenna unit radiating a beam according to predetermined beam characteristics and transmitting a signal of the base station to a mobile terminal in a high speed moving body; a position searching unit detecting a distance, a speed, and a direction of movement between the base station and the mobile terminal; a beam setting unit grouping one or more beams according to the detected distance between the base station and the mobile terminal and setting the number of beam search groups in which a beam search is to be performed and a beam search period according to the detected speed and direction of (Continued)

movement; and a beam searching unit searching for the beam of the mobile terminal based on beam setting values set by the beam setting unit.

14 Claims, 12 Drawing Sheets

(51) Int. Cl.
*G01S 5/00* (2006.01)
*H04W 64/00* (2009.01)
(58) Field of Classification Search
CPC ......... H04W 88/08–10; H04W 64/003; H04W 64/006; H04W 72/042; H04W 72/0413; H01Q 1/246; H01Q 25/00
USPC .................................. 455/63.4, 562.1, 575.7
See application file for complete search history.

(56) References Cited

U.S. PATENT DOCUMENTS

| | | | | |
|---|---|---|---|---|
| 2004/0014499 | A1* | 1/2004 | Hamalainen | G01S 3/14 455/561 |
| 2005/0190105 | A1* | 9/2005 | Ishizu | H04B 7/0617 342/383 |
| 2008/0171516 | A1* | 7/2008 | Kakura | H04B 7/086 455/63.4 |
| 2009/0278743 | A1* | 11/2009 | Wee | H01Q 1/246 342/377 |
| 2010/0165914 | A1* | 7/2010 | Cho | H04B 7/0695 370/328 |
| 2013/0040682 | A1* | 2/2013 | Chang | H01Q 1/243 342/368 |
| 2013/0053018 | A1* | 2/2013 | Kruglick | H04W 16/28 455/422.1 |
| 2013/0084908 | A1* | 4/2013 | Joo | H04W 72/046 455/509 |
| 2013/0252655 | A1 | 9/2013 | Kim et al. | |
| 2013/0331081 | A1* | 12/2013 | Rune | H04B 7/0408 455/418 |
| 2013/0343338 | A1* | 12/2013 | Campos | H04W 16/28 370/330 |
| 2014/0004869 | A1 | 1/2014 | Jung | |
| 2014/0073337 | A1* | 3/2014 | Hong | H04W 16/28 455/452.1 |
| 2014/0162652 | A1* | 6/2014 | Kang | H04W 36/32 455/436 |
| 2014/0323143 | A1* | 10/2014 | Jung | H04B 7/0617 455/452.1 |
| 2015/0195025 | A1* | 7/2015 | Kang | H04B 7/0469 375/267 |
| 2015/0257073 | A1* | 9/2015 | Park | H04B 7/0408 370/331 |
| 2015/0325912 | A1* | 11/2015 | Liu | H01Q 1/1257 342/368 |
| 2016/0047884 | A1* | 2/2016 | Zhang | H04B 7/0617 342/458 |
| 2016/0150418 | A1* | 5/2016 | Kang | H04W 16/28 455/422.1 |
| 2016/0173174 | A1 | 6/2016 | Park et al. | |
| 2016/0241367 | A1* | 8/2016 | Irmer | H04W 4/046 |
| 2016/0249233 | A1* | 8/2016 | Murray | B61L 27/0005 |
| 2016/0323756 | A1* | 11/2016 | Shen | H04W 16/28 |
| 2016/0345221 | A1* | 11/2016 | Axmon | H04W 24/10 |
| 2016/0380692 | A1* | 12/2016 | Jalali | H04B 7/18504 455/11.1 |
| 2017/0105161 | A1* | 4/2017 | Axmon | H04W 36/04 |
| 2017/0311324 | A1 | 10/2017 | Jung | |
| 2017/0317729 | A1* | 11/2017 | Kobayashi | H04B 7/0617 |
| 2018/0083671 | A1* | 3/2018 | Alexander | G01S 19/43 |
| 2018/0367209 | A1* | 12/2018 | Jamaly | B61L 27/0005 |

FOREIGN PATENT DOCUMENTS

KR 10-2015-0105710 A 9/2015
WO 2013-187743 A1 12/2013

* cited by examiner

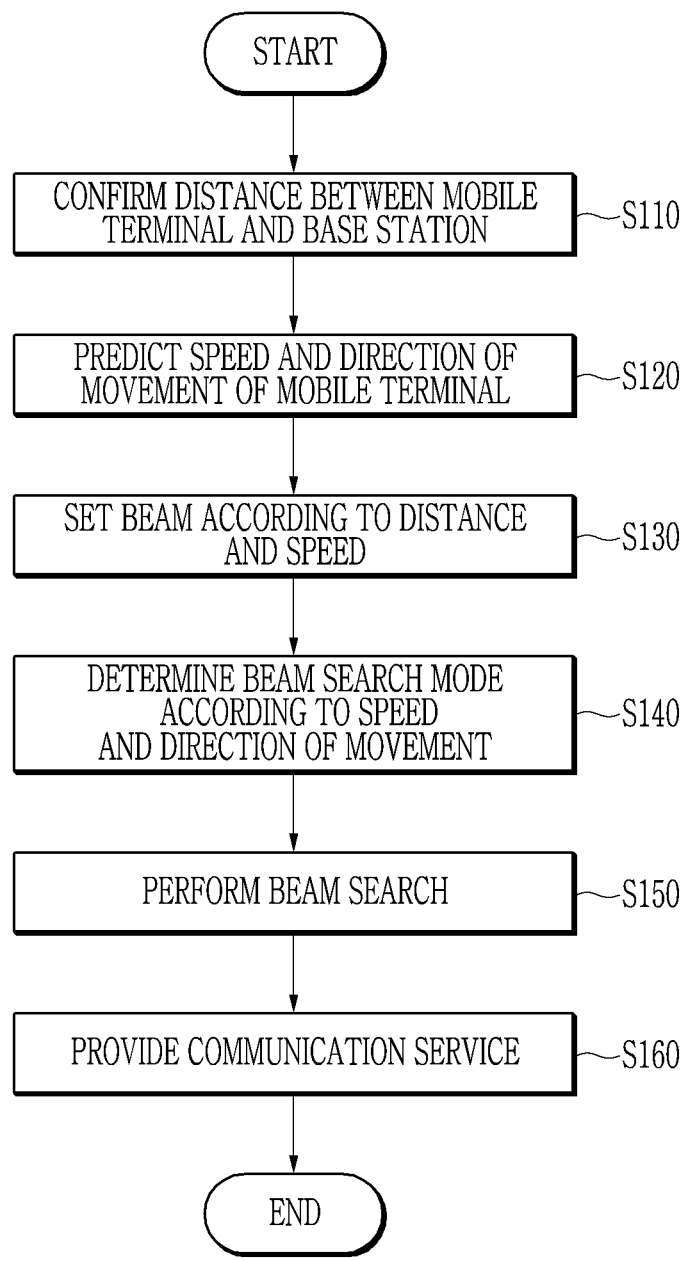

APPARATUS AND METHOD FOR BEAM-FORMING COMMUNICATION IN MOBILE WIRELESS BACKHAUL NETWORK

CROSS-REFERENCE TO RELATED APPLICATION

This application claims priority to and the benefit of Korean Patent Application No. 10-2016-0059981, filed in the Korean Intellectual Property Office on May 17, 2016, the entire content of which is incorporated herein by reference.

BACKGROUND OF THE INVENTION

1. Field of the Invention

The present invention relates to an apparatus and method for beam-forming communication in a mobile wireless backhaul network.

2. Description of Related Art

A mobile terminal serving as a mobile wireless backhaul between a base station and terminals of passengers is disposed in a high speed moving body such as a KTX high-speed train, a train, a subway, or the like, and the corresponding mobile terminal receives data of the base station via a mobile wireless backhaul network and provides Internet services to the terminals of the passengers in the high speed moving body using a technology such as Wi-Fi or femto cell.

Most wireless communication systems including cellular mobile communication currently introduce a beam-forming technology for improving performance. In the case of a mobile wireless backhaul system for the high speed moving body, however, since the mobile terminal moves at high speed, strength of a received signal is significantly attenuated when the beam-forming does not meet the moving speed of the moving terminal. Therefore, in order for the mobile terminal and the base station in the high speed moving body to communicate with each other using the beam-forming technology, beam-forming execution speed in the base station and the mobile terminal should be extremely fast.

In particular, a high frequency band such as utilizable SHF/EHF of a wide frequency band requires sharper beam-forming than a general cellular frequency band due to propagation path loss and atmospheric attenuation, and when such beam does not meet the speed of the high speed moving body, performance attenuation may be significantly increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for beam-forming communication in a mobile wireless backhaul network having advantages of adapting to high moving speed by appropriately utilizing characteristics of the mobile wireless backhaul network for a high speed moving body.

Objects of the present invention are not limited to the above-mentioned objects. That is, other objects that are not mentioned may be obviously understood by those skilled in the art to which the present invention pertains from the following description.

An exemplary embodiment of the present invention provides an apparatus for beam-forming communication in a mobile wireless backhaul network included in a base station including: an antenna unit radiating a beam according to predetermined beam characteristics and transmitting a signal of the base station to a mobile terminal in a high speed moving body; a position searching unit detecting a distance, a speed, and a direction of movement between the base station and the mobile terminal; a beam setting unit grouping one or more beams according to the detected distance between the base station and the mobile terminal and setting the number of beam search groups in which a beam search is to be performed and a beam search period according to the detected speed and direction of movement; and a beam searching unit searching for the beam of the mobile terminal based on beam setting values set by the beam setting unit.

The antenna unit may be implemented in a first type of phased-array antenna structure.

The beam setting unit may set a beam width of the beam search group by adjusting the number of antenna elements of the phased-array antenna structure according to the distance between the base station and the mobile terminal, and set a beam direction of the beam search group by adjusting a phase of each of the antenna elements.

The beam setting unit may select a small number of antenna elements as the distance between the base station and the mobile terminal is decreased to set a wide beam width of the beam search group, and select a large number of antenna elements as the distance between the base station and the mobile terminal is increased to set a narrow beam width of the beam search group.

The antenna unit may be implemented in a second type of multiple horn antenna structure.

The beam setting unit may set a beam coverage of the beam search group by adjusting the number of horn antennas according to the distance between the base station and the mobile terminal, and set a beam direction by adjusting a position of the horn antenna in the beam search group.

The beam setting unit may select the beam search groups in the same direction as and an opposite direction of the direction of movement of the mobile terminal among the beam search groups, and may further select the beam search group in the same direction as the direction of movement of the mobile terminal.

The position searching unit may search for the distance between the base station and the mobile terminal using a time delay of arrival (TDoA) signal. The position searching unit may transmit a 2 bit distance index for the distance between the base station and the mobile terminal to the mobile terminal using a downlink control channel between the base station and the mobile terminal.

Another embodiment of the present invention provides an apparatus for beam-forming communication in a mobile wireless backhaul network included in a mobile terminal in a high speed moving body that moves at high speed including: an antenna unit radiating a beam according to predetermined beam characteristics and receiving a signal of the base station; a position searching unit detecting a distance, a speed, and a direction of movement between the base station and the mobile terminal; a beam setting unit grouping one or more beams according to the detected distance between the base station and the mobile terminal and setting the number of beam search groups in which a beam search is to be performed and a beam search period according to the detected speed and direction of movement; and a beam searching unit searching for the beam of the base station based on beam setting values set by the beam setting unit.

The beam setting unit may select the beam search groups in the same direction as and an opposite direction of a direction of relative movement of the base station among the beam search groups, and may further select the beam search group in the same direction as the direction of relative movement of the base station.

The position searching unit may search for the distance between the base station and the mobile terminal using a time delay of arrival (TDoA) signal, and transmit information on the distance, speed, and a direction of movement between the base station and the mobile terminal to the base station using an uplink control channel.

Yet another embodiment of the present invention provides a method for beam-forming communication in a mobile wireless backhaul network, including detecting a distance, a speed, and a direction of movement between a base station and a mobile terminal; grouping one or more beams of an antenna according to the detected distance between the base station and the mobile terminal and setting the number of beam search groups in which a beam search is to be performed and a beam search period according to the detected speed and direction of movement; and performing the beam search based on the set beam setting values.

According to an embodiment of the present invention, the base station and the mobile terminal in the high speed moving body efficiently and quickly perform the beam-forming by appropriately using characteristics of the mobile wireless backhaul network for the mobile terminal in the high speed moving body, thereby making it possible to provide the high performance beam-forming technology based mobile wireless backhaul service to the mobile terminal in the high speed moving body that moves at high speed.

BRIEF DESCRIPTION OF THE DRAWINGS

FIG. 12 is a diagram illustrating an operation flow for a method for beam-forming communication in a mobile wireless backhaul network according to the present invention.

DETAILED DESCRIPTION OF THE EMBODIMENTS

Figure 1:
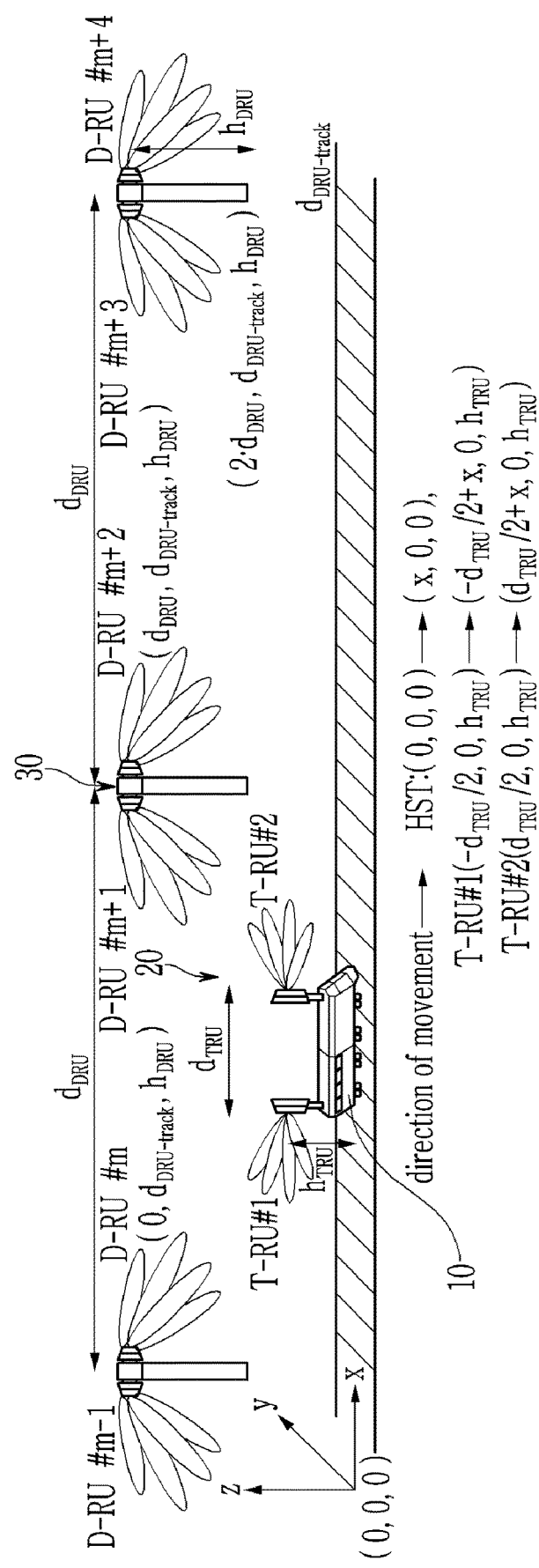
FIG. 1 is a diagram illustrating a communication system to which an apparatus for beam-forming communication in a mobile wireless backhaul network according to the present invention is applied.

Hereinafter, some exemplary embodiments of the present invention will be described in detail with reference to the accompanying drawings. It is to be noted that in giving reference numerals to components of each of the accompanying drawings, the same components will be denoted by the same reference numerals even though they are shown in different drawings. In addition, when it is determined that a detailed description of known configuration or functions obscures an understanding of the present invention, the detailed description thereof will be omitted.

In describing component of the exemplary embodiments of the present invention, terms such as first, second, A, B, (a), (b), etc., may be used. These terms are used only to differentiate the components from other components. Therefore, the nature, order, sequence, etc. of the corresponding components are not limited by these terms. In addition, unless defined otherwise, it is to be understood that all the terms used in the specification including technical and scientific terms have the same meaning as those that are generally understood by those skilled in the art. It must be understood that the terms defined by the dictionary are identical with the meanings within the context of the related art, and they should not be ideally or excessively formally defined unless the context clearly dictates otherwise.

FIG. 1 is a diagram illustrating a communication system to which an apparatus for beam-forming communication in a mobile wireless backhaul network according to the present invention is applied.

As illustrated in FIG. 1, a communication system according to the present invention may include a mobile terminal 20 and a base station 30.

The mobile terminal 20, which is a wireless relay device that moves at high speed, is installed in a high speed moving body 10 such as a high speed train, a train, and a subway to serve to communicate with the base station 30 and to provide mobile wireless backhaul data from the base station 30 to terminals of the user in the high speed moving body 10.

The base station 30 may transmit and receive a signal to and from the mobile terminal 20 via the mobile wireless backhaul network, and provide data requested by the mobile terminal 20 to the mobile terminal 20 via the mobile wireless backhaul network.

A plurality of base stations 30 may be provided and the plurality of base stations 30 may be each disposed around a rail road of the high speed moving body 10 in a predetermined distance unit. Here, the high speed moving body 10 moves only in one direction defined along the rail road. Therefore, in one high speed moving body 10, a first mobile terminal T-RU#1 for transmitting and receiving the signal to and from a first base station D-RU#m located in an opposite direction of a direction of movement of the high speed moving body 10 may be installed in the rear of the high speed moving body 10, and a second mobile terminal T-RU#2 for transmitting and receiving the signal to and from a second base station D-RU#m+1 located in the direction of movement of the high speed moving body 10 may be installed in the front of the high speed moving body 10.

Therefore, when the high speed moving body 10 passes through a section between the first base station and the second base station, the first mobile terminal may transmit and receive the signal to and from the first base station, and the second mobile terminal may transmit and receive the signal to and from the second base station.

In FIG. 1, a distance between the first mobile terminal and the second mobile terminal may be defined as $d_{TRU}$, heights of the first mobile terminal and the second mobile terminal may be defined as $h_{TRU}$, a horizontal distance between the mobile terminal and the base station may be defined as $d_{DRU\_track}$, a distance between the respective base stations may be defined as $d_{DRU}$, and a movement direction of the mobile terminal may be defined as an x axis.

Of course, according to exemplary embodiments, one or more mobile terminals 20 may also be installed at a middle position of the high speed moving body 10. However, the exemplary embodiment of the present invention will be described based on a structure in which the first mobile terminal and the second mobile terminal are installed in the front and rear of the high speed moving body 10, respectively.

Here, as the high speed moving body 10 moves at high speed, the mobile terminal 20 installed in the high speed moving body 10 also moves at high speed. Therefore, in order to increase performance of a mobile wireless backhaul link, the mobile terminal 20 and the base station 30 perform communication using a beam-forming technology.

The apparatus for beam-forming communication in a mobile wireless backhaul network according to the present invention is included in the base station 30 and/or the mobile terminal 20 to control beam-forming characteristics according to a distance, a speed, and a direction of movement of the high speed moving body 10 and to adjust coverage of a beam. Thereby, the apparatus for beam-forming communication in a mobile wireless backhaul network improves signal transmission and reception characteristics between the base station 30 and the mobile terminal 20 in response to the speed of the high speed moving body 10.

Hereinafter, a detailed configuration of the apparatus for beam-forming communication in a mobile wireless backhaul network will be described in more detail with reference to an exemplary embodiment of FIG. 2.

Figure 2:
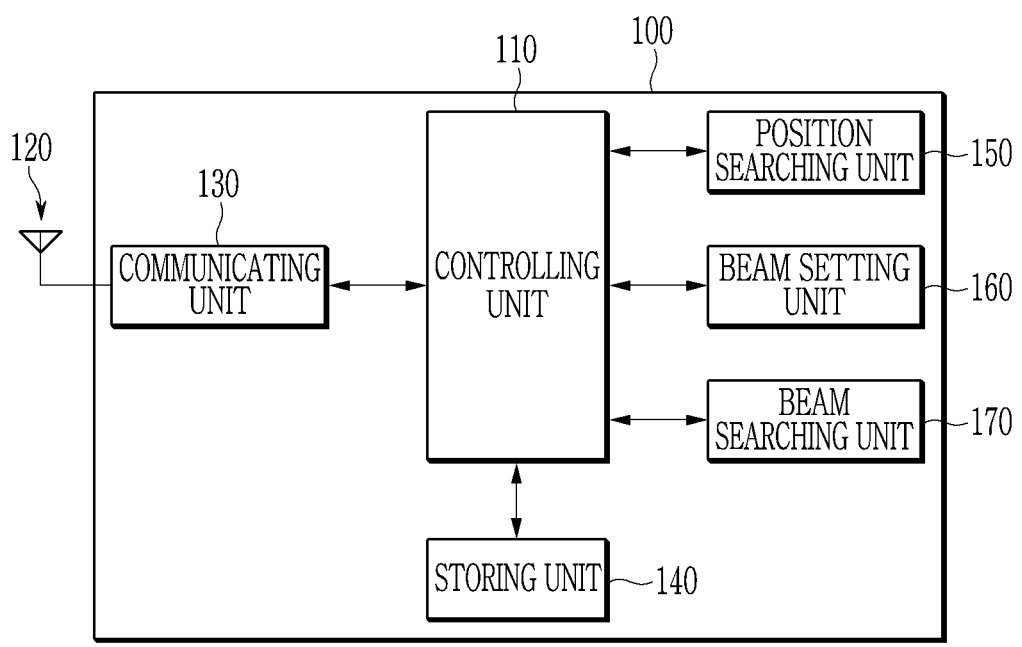
FIG. 2 is a diagram illustrating a configuration of the apparatus for beam-forming communication in a mobile wireless backhaul network according to the present invention.

FIG. 2 is a diagram illustrating a configuration of the apparatus for beam-forming communication in a mobile wireless backhaul network according to the present invention.

The apparatus 100 for beam-forming communication in a mobile wireless backhaul network according to the present invention may be formed integrally with internal controlling units of each of the mobile terminal and/or the base station, and may also be implemented in separate apparatuses to be connected to each of the mobile terminal and/or the base station by a separate connection means.

Referring to FIG. 2, the apparatus 100 for beam-forming communication in a mobile wireless backhaul network according to the present invention may include a controlling unit 110, an antenna unit 120, a communicating unit 130, a storing unit 140, a position searching unit 150, a beam setting unit 160, and a beam searching unit 170. Here, the controlling unit 110 may process the signals transmitted between the respective units of the apparatus 100 for beam-forming communication according to the present invention.

The antenna unit 120 serves to radiate the beam according to predefined characteristics and to transmit and/or receive the signal. In this case, a beam radiation structure of the antenna unit 120 may be adjusted by the beam setting unit 160. The communicating unit 130 serves to support a communication interface with the mobile terminal or the base station, and transmit and receive the signal through the antenna unit 120.

Figure 3:
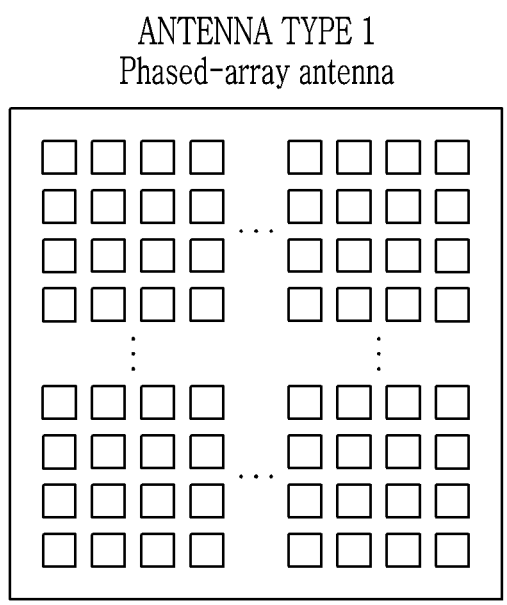
FIG. 3 is a diagram illustrating an antenna type applied to an apparatus for beam-forming communication in a mobile wireless backhaul network according to a first exemplary embodiment of the present invention.

Here, the antenna unit 120 may be implemented in two types. As an example, the antenna unit 120 may be implemented in a first type of phased-array antenna structure, as illustrated in FIG. 3. In this case, a beam width and beam coverage of the antenna unit 120 may be adjusted by the beam setting unit 160.

The beam setting unit 160 groups antenna elements of the phased-array antenna. In this case, the beam setting unit 160 may configure the number of the antenna elements belonging to the group to be different depending on the distance to adjust the beam width and the beam coverage through the antenna elements belonging to the corresponding group. Here, the number of the antenna elements selected at the time of grouping of the antenna elements may be varied depending on the distance between the mobile terminal and the base station.

The first type of phased-array antenna may form a narrow beam width as the number of the antenna elements for transmission is increased. Therefore, in the case in which the distance between the mobile terminal and the base station is long, the beam setting unit 160 may group to include a large number of antenna elements so that a narrow and long beam is formed by the antenna elements of the corresponding group.

Meanwhile, the first type of phased-array antenna may form a wide beam width as the number of the antenna elements for transmission is decreased. Therefore, in the case in which the distance between the mobile terminal and the base station is short, the beam setting unit 160 may group to include a small number of antenna elements so that a wide and short beam is formed by the antenna elements of the corresponding group.

An exemplary embodiment of an operation of grouping the antenna element according to the distance d in the first type of phased-array antenna structure will be described with reference to FIG. 4.

Figure 4:
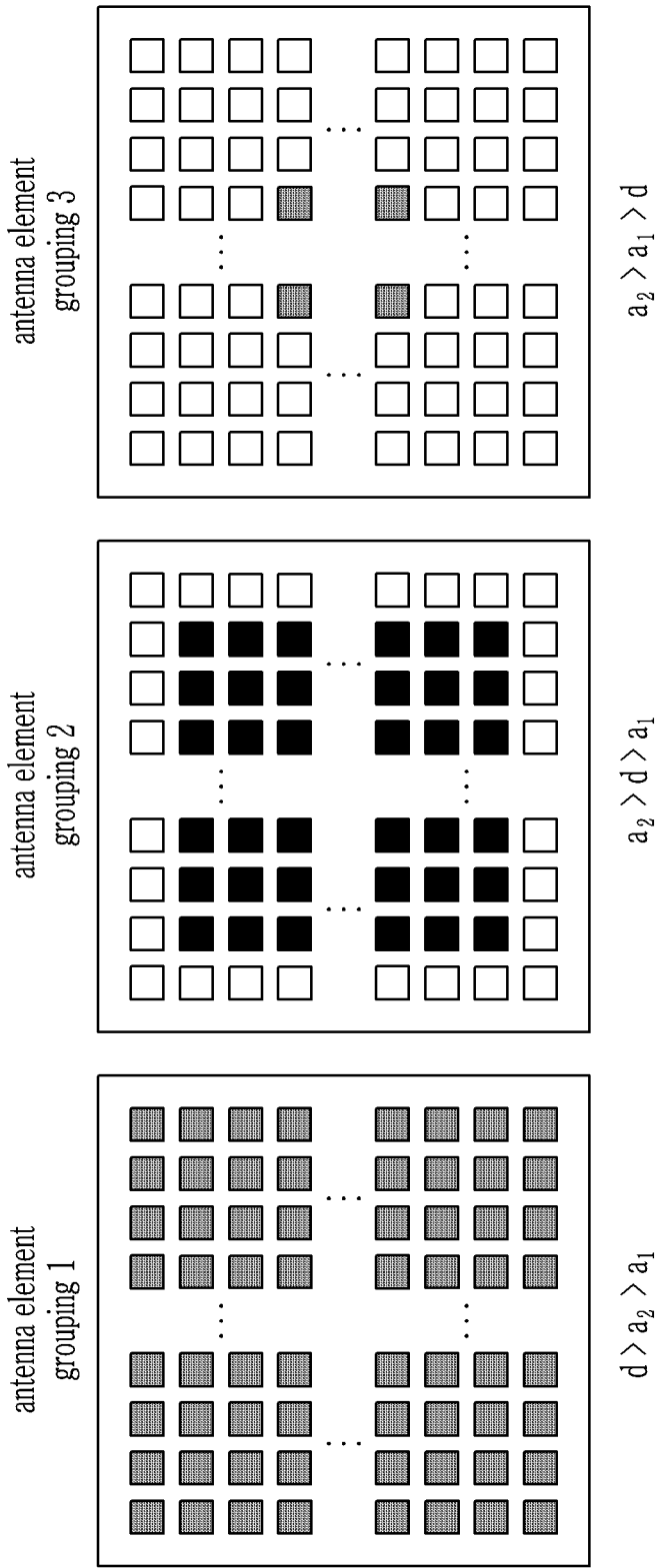
FIG. 4 is a diagram illustrating a beam setting operation of an antenna according to the first exemplary embodiment of the present invention.

Referring to FIG. 4, it may be confirmed that the number of antenna elements of a group (Group 1) grouped when the distance d meets a relationship of 'd>a2>a1' is greater than the number of antenna elements of a group (Group 2) grouped when the distance d meets a relationship of 'a2>d>a1', and it may be confirmed that the number of antenna elements of the group (Group 2) grouped when the distance d meets the relationship of 'a2>d>a1' is greater than the number of antenna elements of a group (Group 3) grouped when the distance d meets a relationship of 'a2>a1>d'. The sum of the total powers set to the antenna elements of Group 1, the sum of the total powers set to the antenna elements of Group 2, and the sum of the powers set to the antenna elements of Group 3 can be the same as each other.

In this case, the beam setting unit 160 may control a direction of the beam by adjusting phases of the antenna elements belonging to the group to perform communication with the mobile terminal or the base station.

Figure 5:
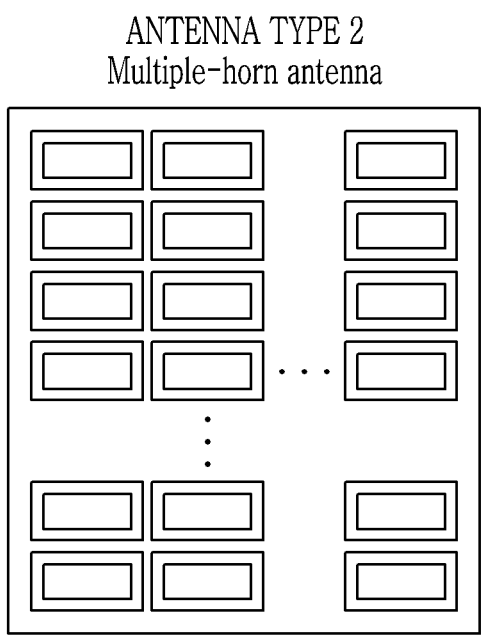
FIG. 5 is a diagram illustrating an antenna type applied to an apparatus for beam-forming communication in a mobile wireless backhaul network according to a second exemplary embodiment of the present invention.

As another example, the antenna unit 120 may also be implemented in a second type of multiple horn antenna structure, as illustrated in FIG. 5. The second type of multiple horn antenna structure may include multiple horn antennas as illustrated in FIG. 5.

Similarly, a beam width and beam coverage of the antenna unit 120 may be adjusted by the beam setting unit 160.

In this case, the beam setting unit 160 may combine one or multiple horn antennas in the horn antenna structure to adjust the beam coverage. In other words, the beam setting unit 160 groups the multiple horn antennas in the second type of multiple horn antenna structure. In this case, the beam setting unit 160 may adjust the beam coverage according to the number of horn antennas belonging to the group.

In addition, the beam setting unit 160 may control a direction of beam by adjusting a position of the horn antenna belonging to the group in the second type of multiple horn antenna structure.

A detailed exemplary embodiment of an operation of grouping the horn antennas of the second type of multiple horn antenna structure will be described with reference to FIG. 6.

Figure 6:
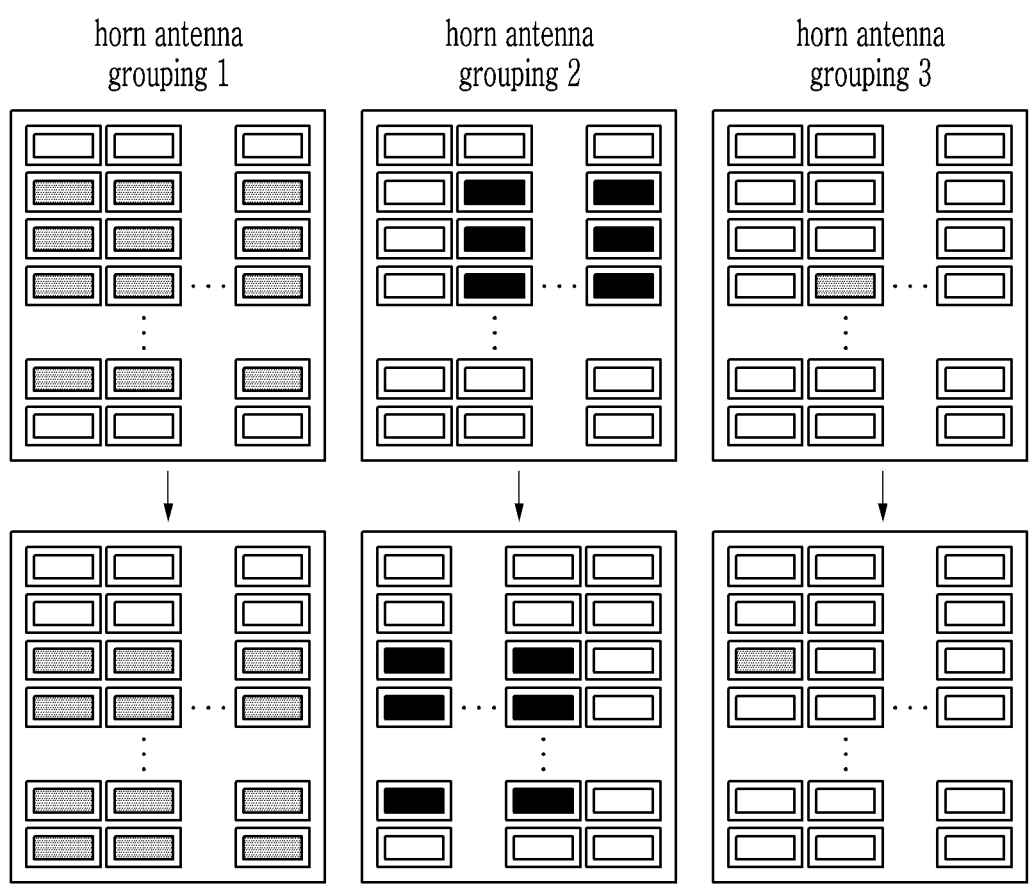
FIG. 6 is a diagram illustrating a beam setting operation of an antenna according to the second exemplary embodiment of the present invention.

Referring to FIG. 6, the grouping is performed by selecting different numbers of horn antennas such as a group 1, a group 2, and a group 3 according to the beam coverage, and in this case, it is possible to control the beam direction by adjusting a position of the selected horn antenna. The sum of the total powers set to the horn antennas of group 1, the sum of the total powers set to the horn antennas of group 2, and the sum of the powers set to the horn antennas of group 3 can be the same as each other.

The position searching unit 150 searches for a position of the mobile terminal or the base station to confirm the distance between the mobile terminal and the base station. In this case, since the mobile terminal moves at high speed by the high speed moving body, the position searching unit 150 searches the position using a time delay of arrival (TDoA) signal.

As an example, in the case of the base station, the position searching unit 150 may detect the distance between the mobile terminal and the base station using the TDoA signal which is periodically transmitted by the mobile terminal. In this case, the position searching unit 150 may transmit a 2 bit distance index for detected distance information between the mobile terminal and the base station to the mobile terminal using a downlink control channel to decrease an overhead of the downlink control channel.

The 2 bit distance index for the distance information between the mobile terminal and the base station may be illustrated as in Table 1 below.

TABLE 1

| Distance Index (2 bit) | Distance Between High Speed Moving Body Terminal and Base Station |
|---|---|
| 0 (00) | [0, 80) m |
| 1 (01) | [80, 200) m |
| 2 (10) | [200, 400) m |
| 3 (11) | [400, Maximum Coverage of Cell] m |

In other words, in the case in which the distance between the mobile terminal and the base station is 0 m or more and is less than 80 m, the 2 bit distance index may be '00' corresponding to 0. In addition, in the case in which the distance between the mobile terminal and the base station is 80 m or more and is less than 200 m, the 2 bit distance index may be '01' corresponding to 1. In addition, in the case in which the distance between the mobile terminal and the base station is 200 m or more and is less than 400 m, the 2 bit distance index may be '10' corresponding to 2, and in the case in which the distance is between 400 m or more and maximum coverage of a cell, the 2 bit distance index may be '11' corresponding to 3.

Therefore, the position searching unit 150 may extract the 2 bit distance index corresponding to the distance between the mobile terminal and the base station from Table 1 and transmit the extracted 2 bit distance index to the mobile terminal through the downlink control channel.

In addition, the position searching unit 150 of the base station may predict speed and a direction of movement of the mobile terminal using the distance information between the mobile terminal and base station.

Meanwhile, in the case in which it is not easy to detect the position of the mobile terminal from the TDoA signal, the position searching unit 150 of the base station may also receive the distance information between the mobile terminal and the base station, and information on the speed and the direction of movement of the mobile terminal from the mobile terminal through an uplink control channel.

As another example, in the case of the mobile terminal, the position searching unit 150 may detect the distance between the mobile terminal and the base station using the TDoA signal which is periodically transmitted by the base station. In this case, the position searching unit 150 may transmit distance information on the detected distance between the mobile terminal and the base station to the base station using the uplink control channel.

Of course, in the case in which the position searching unit 150 receives the 2 bit distance index for the distance information between the mobile terminal and the base station through the downlink control channel, the position searching unit 150 does not separately transmit the detected distance information.

In the case of the mobile terminal, since the position searching unit 150 may know the information on the speed and the direction of movement of the mobile terminal, a separate calculation process of predicting the speed and the direction of movement is omitted.

As relative speed between the mobile terminal and the base station is changed, a channel coherence time is changed, and as the distance between the mobile terminal and the base station is changed, change speeds of an angle of departure (AoD) for a transmission beam of the base station and an angle of arrival (AoA) for a reception beam of the mobile terminal are varied. The change speeds of the AoD and the AoA according to the distance and the speed may be seen from graphs of FIGS. 7 to 10.

Therefore, the beam setting unit 160 sets beam characteristics based on a relative distance, a relative speed, and a direction of movement between the mobile terminal and the base station.

First, the beam setting unit 160 may set the beam width of the antenna unit 120 as described above according to the relative distance between the mobile terminal and the base station. In addition, the beam setting unit 160 determines a beam searching range based on the relative speed and the direction of movement between the mobile terminal and the base station.

The beam setting unit 160 selects $N_{sub,i}$ beam search groups among $N_{total,i}$ beam search groups at the time of searching the beam. In this case, the beam setting unit 160 may mainly select the beam search group in the same direction as the relative direction of movement of the mobile terminal or the base station.

Here, $N_{sub,i}$ may be expressed as the following Equation 1.

$$N_{sub,i} = N_{sub,i}^{(+)} + N_{sub,i}^{(-)} + 1 \quad \text{[Equation 1]}$$

In Equation 1, i denotes an integer of 0 or more, $N^{(+)}_{sub,i}$ means the number of beam search groups in the same direction as the direction of relative movement when the mobile terminal or the base station intends to perform a transmission or reception beam-forming, and $N^{(-)}_{sub,i}$ means the number of beam search groups in an opposite direction of the direction of relative movement when the mobile terminal or the base station intends to perform the transmission or reception beam-forming. In this case, it is assumed that $N^{(+)}_{sub,i}$ is greater than $N^{(-)}_{sub,i}$.

As such, the beam setting unit 160 selects a larger number of beams in the same direction as the direction of relative movement of the mobile terminal or the base station in selecting the searching beam, thereby making it possible to increase efficiency at the time of searching for beam.

In addition, the beam setting unit 160 may set a beam search period according to the distance and the relative speed between the mobile terminal and the base station. In this case, as the relative speed between the mobile terminal and the base station is increased, the beam setting unit 160 may set the beam search period to be short. Beam setting values according to the distance and the relative speed between the mobile terminal and the base station may be illustrated as in Table 2 below.

TABLE 2

| Distance Index (2 bit) | Speed of High Speed Moving Body Terminal | Beam Width | Beam Search Set | Beam Search Period |
|---|---|---|---|---|
| 0 (00) | $V_0$ $V_1$ ... $V_{M-1}$ | $W_{beam,0}$ | $N_{total,0}$ | $T_{00}$ $T_{01}$ ... $T_{0M-1}$ |
| 1 (01) | $V_0$ $V_1$ ... $V_{M-1}$ | $W_{beam,1}$ | $N_{total,1}$ | $T_{10}$ $T_{11}$ ... $T_{3M-1}$ |
| 2 (10) | $V_0$ $V_1$ ... $V_{M-1}$ | $W_{beam,2}$ | $N_{total,2}$ | $T_{20}$ $T_{21}$ ... $T_{2M-1}$ |
| 3 (11) | $V_0$ $V_1$ ... $V_{M-1}$ | $W_{beam,3}$ | $N_{total,3}$ | $T_{30}$ $T_{31}$ ... $T_{3M-1}$ |
| 2 (10) | $V_0$ $V_1$ ... $V_{M-1}$ | $W_{beam,2}$ | $N_{total,2}$ | $T_{20}$ $T_{21}$ ... $T_{2M-1}$ |
| 3 (11) | $V_0$ $V_1$ ... $V_{M-1}$ | $W_{beam,3}$ | $N_{total,3}$ | $T_{30}$ $T_{31}$ ... $T_{3M-1}$ |

In Table 2, in the case of the first type of phased-array antenna, the beam width may be $W_{beam,1} > W_{beam,0} \approx W_{beam,2} > W_{beam,3}$, and a total number of beam search groups may be $N_{total,1} > N_{total,0}$ $N_{total,2} > N_{total,3}$.

Meanwhile, in the case of the second type of multiple horn antenna, the number of horn antenna groups may be $W_{beam,1} > W_{beam,0}$ $W_{beam,2} > W_{beam,3}$, and a total number of horn antenna group sets may be $N_{total,1} > N_{total,0}$ $N_{total,2} > N_{total,3}$.

In addition, the beam search period may be $T_{1,M-1} < T_{0,M-1}$ $T_{2,M-1} < T_{3,M-1}$. If the speed $V_y$ of the mobile terminal is $V_{i,0} < V_{i,1} < \ldots < V_{i,M-1}$ (where, i=0, 1, 2, 3), as the speed $V_y$ of the mobile terminal is increased, the beam search period may also be set to be gradually increased such as $T_{i,0} < T_{i,1} < \ldots < T_{i,M-1}$.

The beam searching unit 170 performs the beam search through the antenna unit 120 based on the beam width, the beam search group, and the beam search period set by the beam setting unit 160.

As an example, a beam search operation of the base station will be described with reference to an exemplary embodiment of FIG. 7.

Figure 7:
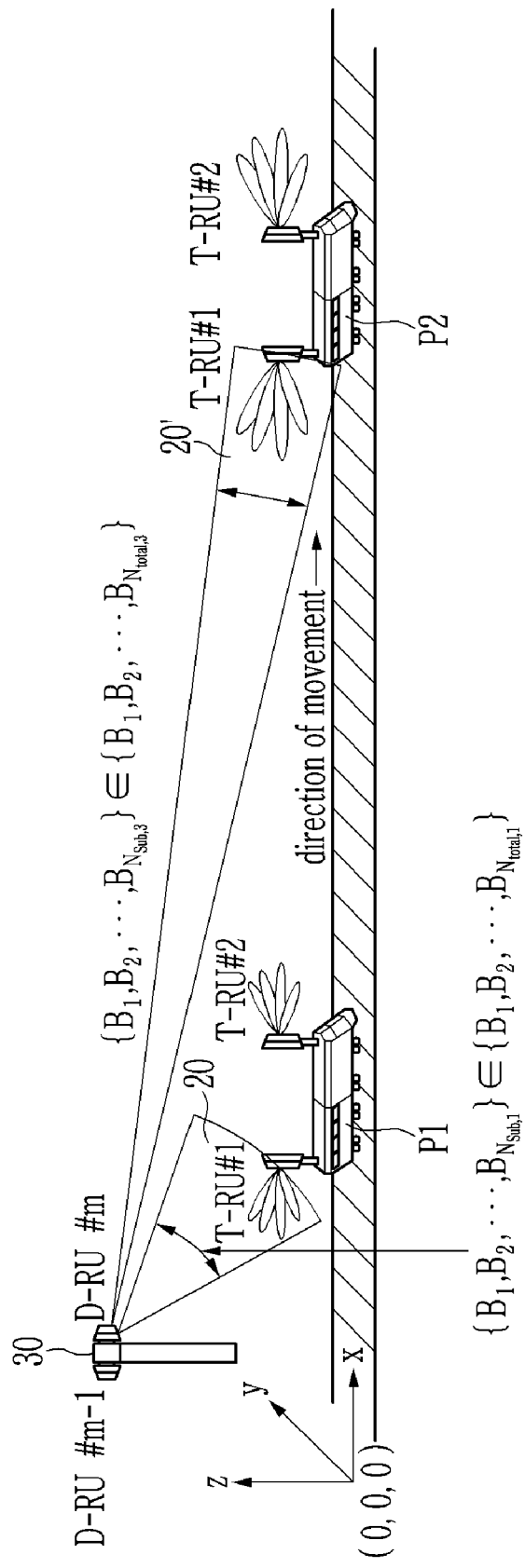
FIGS. 7 and 8 are diagrams illustrating changes of beam characteristics according to a distance of the apparatus for beam-forming communication in a mobile wireless backhaul network according to the present invention.
Figure 8:
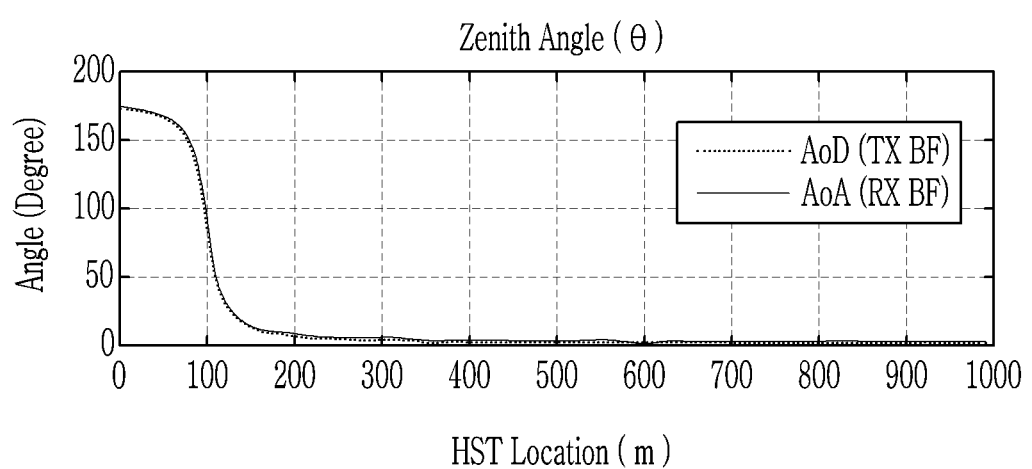
Figure 9:
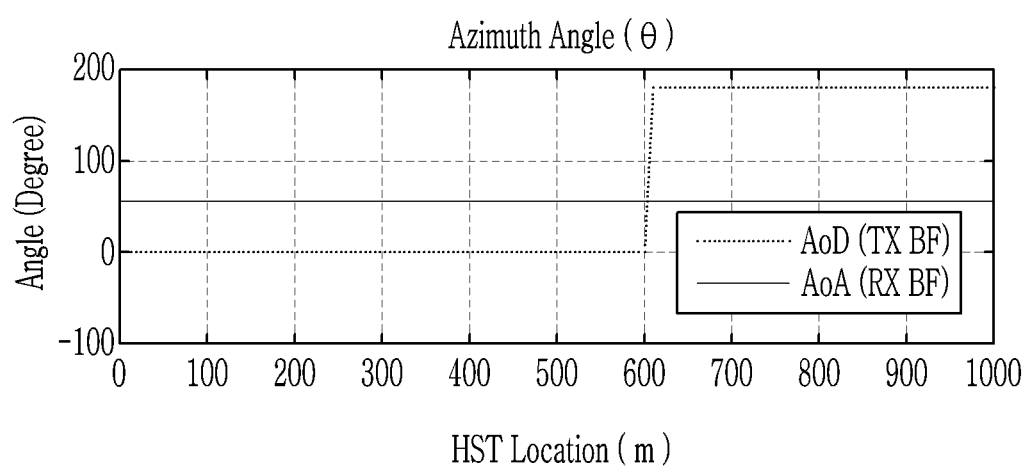
FIGS. 9 and 10 are diagrams illustrating changes of beam characteristics according to speed of the apparatus for beam-forming communication in a mobile wireless backhaul network according to the present invention.
Figure 10:
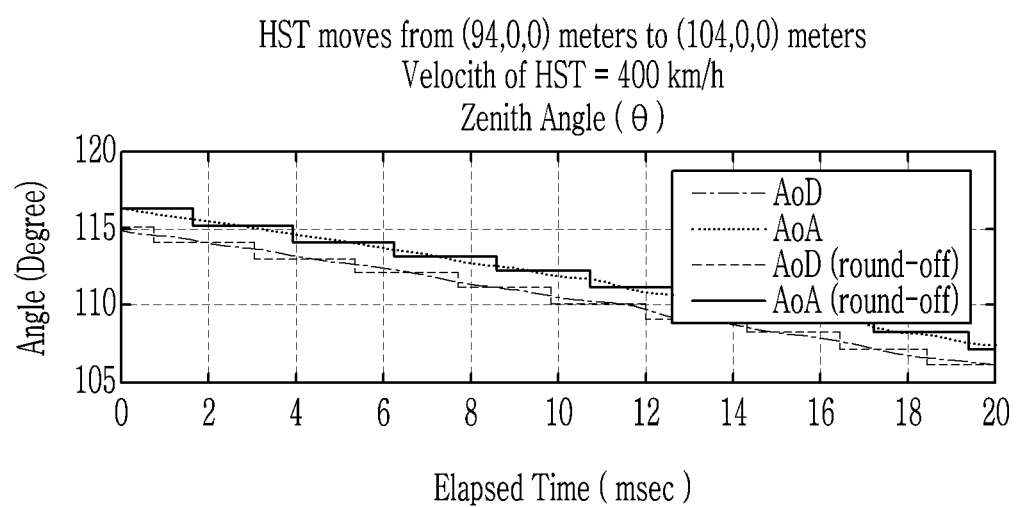
Figure 11:
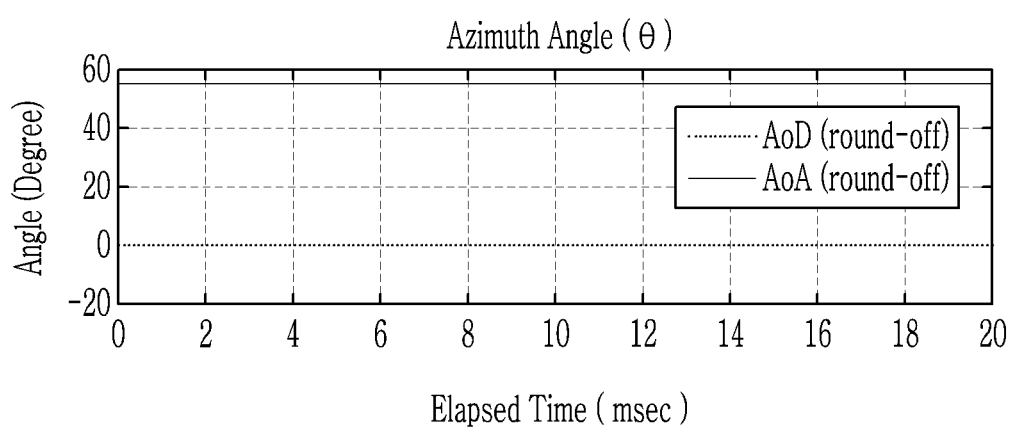
FIG. 11 is a diagram referred to describe an operation of a system to which the apparatus for beam-forming communication in a mobile wireless backhaul network according to the present invention is applied.

As illustrated in FIG. 7, in case the high speed moving body passes through a first position P1 where the distance between the base station D-RU #m 30 and the mobile terminal T-RU #1 20 corresponds to the distance index '01', the apparatus for beam-forming communication of the base station D-RU #m 30 sets the beam width to $W_{beam,1}$ to allow the wide and short beam to be formed, and selects $N_{sub,1}$ beam search groups {B1, B2, ..., $B_{N\_sub,1}$} in a direction of the mobile terminal T-RU #1 20 among $N_{total,1}$ beam search groups {B1, B2, ..., $B_{N\_total,1}$} to perform the beam search for the mobile terminal T-RU #1 20.

Meanwhile, when the high speed moving body moves forward from the first position P1 and passes through a second position P2, if a distance between the base station D-RU #m 30 and the mobile terminal T-RU #1 20' is increased, which corresponds to the distance index '11', the apparatus for beam-forming communication of the base station D-RU #m 30 sets the beam width to $W_{beam,3}$ to allow the narrow and long to be formed, and selects $N_{sub,3}$ beam search groups {B1, B2, ..., $B_{N\_sub,3}$} in a direction of the mobile terminal T-RU #1 20' among $N_{total,3}$ beam search groups {B1, B2, ..., $B_{N\_total,3}$} to perform the beam search for the mobile terminal T-RU #1 20'.

The storing unit 140 stores data and programs required to operate the apparatus 100.

As an example, the storing unit 140 may store beam set values for operating the apparatus 100 and grouped beam search group information, and may store relative position information between the mobile terminal and the base station.

In addition, the storing unit 140 may also include an algorithm for adjusting the beam of the antenna unit 120 and algorithm for performing the beam search according to the set value.

Here, the storing unit 140 may include at least one storage medium of a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

An operation flow of the apparatus according to the present invention having the configuration as described above will be described below in more detail.

FIG. 12 is a diagram illustrating an operation flow for a method for beam-forming communication in a mobile wireless backhaul according to the present invention.

Referring to FIG. 12, the apparatus for a beam-forming communication in a mobile wireless backhaul confirms the distance between the mobile terminal and the base station using the TDoA signal (S110), and predicts the speed and the direction of movement of the mobile terminal based on the distance information between the mobile terminal and the base station confirmed in 'S110'. Here, since the position of the base station is fixed and the speed thereof is 0, the relative speed between the mobile terminal and the base station may be understood as the speed of the mobile terminal.

Next, the apparatus for a beam-forming communication in a mobile wireless backhaul sets beam characteristics according to the distance between the mobile terminal and the base station and the speed of the mobile terminal (S130, S140).

As an example, the apparatus for a beam-forming communication in a mobile wireless backhaul may set the beam width, the direction, and the beam search group according to the distance and the direction of movement between the mobile terminal and the base station, and may set the beam search period according to the distance and the speed of the mobile terminal. In addition, the apparatus for a beam-forming communication in a mobile wireless backhaul may set the number of beam search groups in which the beam searching is to be performed according to the speed of the mobile terminal.

If the setting of the beam characteristics is completed according to the distance, the speed, and the direction of the movement between the mobile terminal and the base station, the apparatus for a beam-forming communication in a mobile wireless backhaul performs the beam searching based on the values set in 'S130' and 'S140' (S150).

If the beam is searched in 'S150', the apparatus for a beam-forming communication in a mobile wireless backhaul provides a communication service based on the searched beam (S160).

The spirit of the present invention has been merely exemplified. It will be appreciated by those skilled in the art that various modifications and alterations can be made without departing from the essential characteristics of the present invention.

Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

What is claimed is:

1. An apparatus for beam-forming communication in a mobile wireless backhaul network included in a base station, the apparatus comprising:
a position searching unit determining a distance between the base station and a mobile terminal, a relative speed between the base station and the mobile terminal, and a relative direction of the mobile terminal;
a beam setting unit
determining a plurality of beam search groups including searching beams of the base station according to the distance, wherein the searching beams are beams to be searched by the mobile terminal,
determining a number of antenna elements forming the searching beams, wherein the antenna elements are included in each of the plurality of beam search groups, and
setting a number of the searching beams and a search period for a beam of the mobile terminal according to the relative speed and the relative direction; and
a beam searching unit searching for the beam of the mobile terminal based on the search period using the plurality of beam search groups,
wherein the antenna elements are included in a phased-array antenna, and the number of first beam search groups among the plurality of beam search groups are selected more than the number of second beam search groups among the plurality of beam search groups,
wherein the first beam search groups are the beam search groups in the same direction as the relative direction of the mobile terminal, and the second beam search groups are the beam search groups in a direction opposite to the relative direction of the mobile terminal.

2. The apparatus of claim 1, wherein the beam setting unit sets a beam width of the beam search group by adjusting the number of antenna elements of the phased-array antenna structure according to the distance between the base station and the mobile terminal, and sets a beam direction of the beam search group by adjusting a phase of each of the antenna elements.

3. The apparatus of claim 2, wherein the beam setting unit selects a small number of antenna elements as the distance between the base station and the mobile terminal is decreased to set a wide beam width of the beam search group, and selects a large number of antenna elements as the distance between the base station and the mobile terminal is increased to set a narrow beam width of the beam search group.

4. The apparatus of claim 1, wherein the antenna unit is implemented in a second type of multiple horn antenna structure.

5. The apparatus of claim 4, wherein the beam setting unit sets a beam coverage of the beam search group by adjusting the number of horn antennas according to the distance between the base station and the mobile terminal, and sets a beam direction by adjusting a position of the horn antenna in the beam search group.

6. The apparatus of claim 1, wherein the position searching unit searches for the distance between the base station and the mobile terminal using a time delay of arrival (TDoA) signal.

7. The apparatus of claim 1, wherein the position searching unit transmits a 2 bit distance index for the distance between the base station and the mobile terminal to the mobile terminal using a downlink control channel between the base station and the mobile terminal.

8. An apparatus for beam-forming communication in a mobile wireless backhaul network included in a mobile terminal in a high speed moving body that moves at high speed, the apparatus comprising:
a position searching unit determining a distance between a base station and the mobile terminal, a relative speed between the base station and the mobile terminal, and a relative direction of the base station;
a beam setting unit
determining a plurality of beam search groups including searching beams of the mobile terminal according to the distance, wherein the searching beams are beams to be searched by the base station,
determining a number of antenna elements forming the searching beams, wherein the antenna elements are included in each of the plurality of beam search groups, and
setting a number of the searching beams and a search period for a beam of the base station according to the relative speed and the relative direction; and
a beam searching unit searching for the beam of the base station based on the search period using the plurality of beam search groups,
wherein the antenna elements are included in a phased-array antenna, and the number of first beam search groups among the plurality of beam search groups are selected more than the number of second beam search groups among the plurality of beam search groups, wherein the first beam search groups are the beam search groups in the same direction as the relative direction of the base station, and the second beam search groups are the beam search groups in a direction opposite to the relative direction of the base station.

9. The apparatus of claim 8, wherein the position searching unit searches for the distance between the base station and the mobile terminal using a time delay of arrival (TDoA) signal, and transmits information on the distance, the speed, and the direction of movement between the base station and the mobile terminal to the base station using an uplink control channel.

10. A method for beam-forming communication in a mobile wireless backhaul network, the method comprising:
determining a distance between a base station and a mobile terminal, a relative speed between the base station and the mobile terminal, and a relative direction of the mobile terminal;
determining a plurality of beam search groups including searching beams of the base station according to the distance, wherein the searching beams are beams to be searched by the mobile terminal, determining a number of antenna elements forming the searching beams, wherein the antenna elements are included in each of the plurality of beam search groups, and setting a number of the searching beams and a search period for a beam of the mobile terminal according to the relative speed and the relative direction; and
performing beam search of the mobile terminal based on the search period using the plurality of beam search groups,
wherein the antenna elements are included in a phased-array antenna,
wherein the determining selects the number of first beam search groups among the plurality of beam search groups more than the number of second beam search groups among the plurality of beam search groups,
wherein the first beam search groups are the beam search groups in the same direction as the relative direction of the mobile terminal, and the second beam search groups are the beam search groups in a direction opposite to the relative direction of the mobile terminal.

11. The method of claim 10, wherein the setting includes:
setting a beam width of a beam search group by adjusting the number of antenna elements of the phased-array antenna structure according to the distance between the base station and the mobile terminal; and
setting a beam direction of the beam search group by adjusting a phase of each of the antenna elements.

12. The method of claim 11, wherein in the setting, as the distance between the base station and the mobile terminal is decreased, a small number of antenna elements is selected to set a wide beam width of the beam search group, and as the distance between the base station and the mobile terminal is increased, a large number of antenna elements is selected to set a narrow beam width of the beam search group.

13. The method of claim 10, wherein the antenna is implemented in a second type of multiple horn antenna structure.

14. The method of claim 13, wherein the setting includes:
setting a beam coverage of the beam search group by adjusting the number of horn antennas according to the distance between the base station and the mobile terminal; and
setting a beam direction by adjusting a position of the horn antenna in the beam search group.

* * * * *